United States Patent
Chan et al.

(10) Patent No.: US 9,235,675 B2
(45) Date of Patent: Jan. 12, 2016

(54) MULTIDIMENSIONAL MONTE-CARLO SIMULATION FOR YIELD PREDICTION

(75) Inventors: Wei Min Chan, Sindian (TW); Shao-Yu Chou, Chu-Pei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 551 days.

(21) Appl. No.: 13/078,330

(22) Filed: Apr. 1, 2011

(65) Prior Publication Data
US 2012/0253775 A1 Oct. 4, 2012

(51) Int. Cl.
*G06F 17/50* (2006.01)

(52) U.S. Cl.
CPC ........ *G06F 17/5081* (2013.01); *G06F 2217/10* (2013.01)

(58) Field of Classification Search
CPC ............ G06F 17/5081; G06F 2217/10; G06F 2217/84
USPC .......................................................... 703/14
See application file for complete search history.

(56) References Cited

U.S. PATENT DOCUMENTS

| | | | |
|---|---|---|---|
| 6,249,901 B1 * | 6/2001 | Yuan et al. .................... 716/103 |
| 7,437,697 B2 * | 10/2008 | Venkateswaran et al. .... 716/113 |
| 7,890,904 B2 * | 2/2011 | Murgai et al. ................. 716/113 |
| 7,895,029 B2 * | 2/2011 | King et al. ....................... 703/15 |
| 8,001,516 B2 * | 8/2011 | Smith et al. ................... 716/136 |
| 8,037,430 B2 * | 10/2011 | Papanikolaou et al. ......... 716/56 |
| 8,286,112 B2 * | 10/2012 | Miranda et al. ............... 716/110 |
| 8,302,047 B2 * | 10/2012 | Buss et al. ..................... 716/108 |
| 2008/0141190 A1 * | 6/2008 | Jung et al. .......................... 716/4 |
| 2010/0250187 A1 * | 9/2010 | Zuber et al. ................... 702/179 |

OTHER PUBLICATIONS

Pelgrom et al., "Matching Properties of MOS Transistors," 1989, IEEE Journal of Solid-State Circuits 24, No. 5, pp. 1433-1440.*
Pelgrom et al., "A CCD delay line for video applications," 1987, IEEE Trans. Consumer Electron., vol. CE-33, pp. 603-609.*
Hung et al., "Monte Carlo Simulation of Device Variations and Mismatch in Analog Integrated circuits", Apr. 6-8, 2006, Proceedings of the National Conference on Undergraduate Research (NCUR), pp. 1-8.*

* cited by examiner

*Primary Examiner* — Kamini S Shah
*Assistant Examiner* — Juan Ochoa
(74) *Attorney, Agent, or Firm* — Slater & Matsil, L.L.P.

(57) ABSTRACT

An embodiment includes a computer program product for providing a yield prediction. The computer program product has a non-transitory computer readable medium with a computer program embodied thereon. The computer program comprises computer program code for obtaining a representation of a circuit. The circuit comprises a common path and a critical path, and the critical path represents multiple parallel paths. The computer program further comprises computer program code for obtaining a first table representing the common path and a second table representing the multiple parallel paths and computer program code for performing a variable based simulation based on the representation of the circuit, the first table, and the second table. The computer program also comprises computer program code for determining a result indication of each of the multiple parallel paths based on the variable based simulation compared with a predetermined specification.

20 Claims, 7 Drawing Sheets

| Event | MC Run | SA Random Number | SRAM Random Number | Run Pass/Fail | Event Pass/Fail |
|---|---|---|---|---|---|
| 0 | 0 | RandomSA[0] | RandomSRAM[0][0] | Pass | Pass |
|  | 1 |  | RandomSRAM[0][1] | Pass |  |
|  | 2 |  | ... | ... |  |
|  | 3 |  | RandomSRAM[0][255] | Pass |  |
| 1 | 0 | RandomSA[1] | RandomSRAM[1][0] | Pass | Fail |
|  | 1 |  | RandomSRAM[1][1] | Fail |  |
|  | 2 |  | ... | ... |  |
|  | 3 |  | RandomSRAM[1][255] | Pass |  |
| ... | ... | ... | ... | ... | ... |
| 999 | 0 | RandomSA[999] | RandomSRAM[999][0] | Pass | Pass |
|  | 1 |  | RandomSRAM[999][1] | Pass |  |
|  | 2 |  | ... | ... |  |
|  | 3 |  | RandomSRAM[999][255] | Pass |  |

Figure 4B

MULTIDIMENSIONAL MONTE-CARLO SIMULATION FOR YIELD PREDICTION

BACKGROUND

Generally, in integrated circuit design, a circuit layout is simulated before fabrication begins to determine a yield probability. The yield probability may then, for example, be used to determine whether a sufficient amount of chips may be predicted to have proper functionality to justify the costs of chips that are non-functional due to processing variations. As is known in the art, processing variations may result in non-ideal devices that may affect the functionality of the chip.

Many integrated circuits include parallel paths, and techniques to determine the yield probability of these integrated circuits may treat the circuits as one-dimensional during simulation. These techniques may have deficiencies. For example, one method may simulate the circuits by requiring long vectors and a long simulation time. In this method, each of N parallel paths may be simulated as N serial jobs of full circuitry. Thus, this method may require more random variables and a long simulation time. In another technique, the yield probability may be calculated using complex probability calculations. This method may not provide an intuitive yield probability for the integrated circuits, and thus, this method may not be easily understood.

Accordingly, there is a need in the art to overcome these stated deficiencies.

BRIEF DESCRIPTION OF THE DRAWINGS

For a more complete understanding of the present embodiments, and the advantages thereof, reference is now made to the following descriptions taken in conjunction with the accompanying drawings, in which:

FIGS. 4A and 4B illustrate an example of an embodiment in the context of static random access memory (SRAM) circuitry;

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to a specific context, namely a two-dimensional Monte-Carlo simulation process and systems for implementing the process. However, other embodiments include a simulation having more than two dimensions. A person having ordinary skill in the art will readily understand modifications to achieve more than two dimensions, and as such, specific mention of the modifications is not addressed herein. Further, a specific example is described with regard to simulation of static random access memory (SRAM) circuitry, although other embodiments include different circuitry.

Figure 1A:
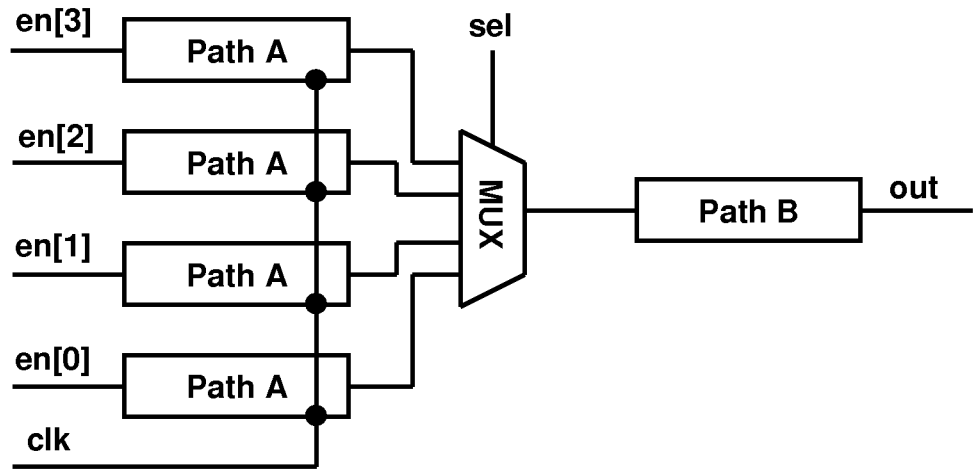
FIG. 1A is a conceptual circuit that comprises parallel paths and a common path according to an embodiment.

FIG. 1A illustrates a conceptual circuit that comprises parallel paths and a common path. The circuit comprises four parallel paths Path A with each being controlled by a respective enable signal en[0] to en[3] and a clock signal clk. Each parallel path Path A is input into a multiplexer MUX, and a selection control signal sel controls the output of the multiplexer MUX. A signal output from the multiplexer MUX is output through a common path Path B. Each parallel path Path A has substantially the same electrical characteristics of the other parallel paths. For example, if a first path includes circuitry components and other paths do not include circuitry components corresponding to the circuitry components of the first path, the first path would not be parallel with the other paths; however, some variations between paths, e.g., minor variations in characteristics between corresponding circuitry of different paths, will not exclude paths from being parallel, such as variations of path resistance due to differing interconnect lengths.

Figure 1B:
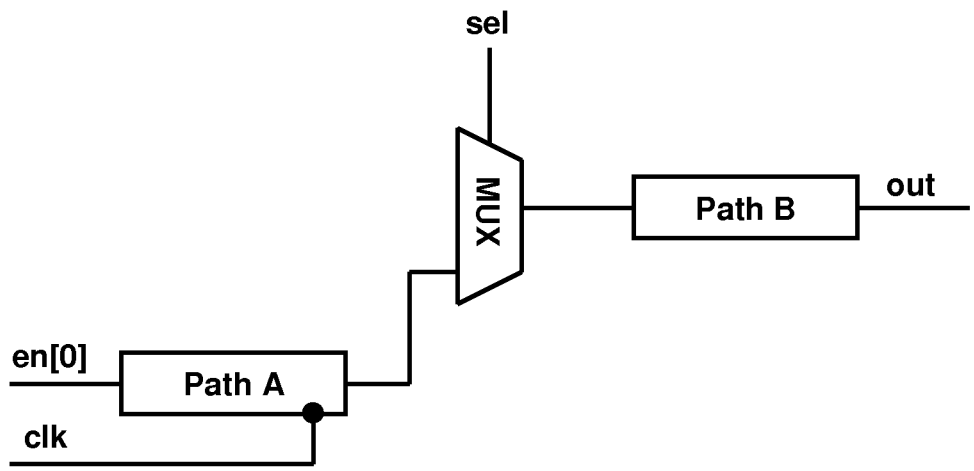
FIG. 1B is the conceptual circuit of FIG. 1A reduced to one critical parallel path according to an embodiment.

FIG. 1B depicts the conceptual circuit of FIG. 1A reduced to one critical parallel path Path A instead of the four parallel paths shown in FIG. 1A. With the parallel paths having substantially the same characteristics, any parallel path may be chosen as the critical path. It may be advantageous, however, to choose, as the critical path, the parallel path that includes, for example, the longest or highest resistance interconnects that may have a greater number of variations that are likely to cause a device failure during operation.

Figure 2:
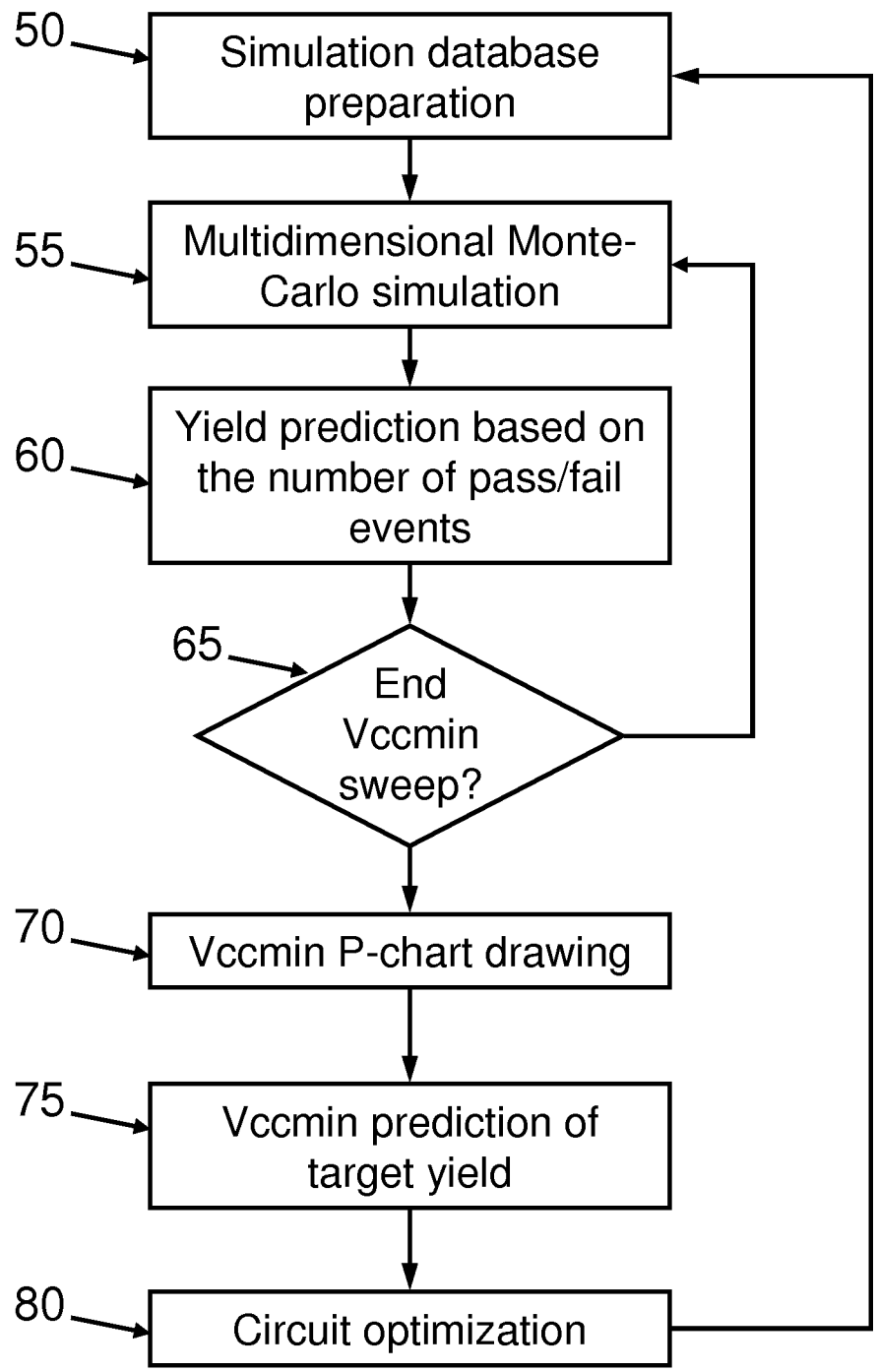
FIG. 2 is an exemplary process according to an embodiment.

FIG. 2 is an exemplary process according to an embodiment that is discussed in the context of the circuit of FIGS. 1A and 1B. The process includes preparation of a simulation database 50. The preparation 50 includes obtaining a SPICE model for a circuit that includes multiple parallel paths and a common path, such as those conceptually discussed in FIG. 1A. The circuit SPICE model then is reduced to a single critical path and the common path, such as conceptually shown in FIG. 1B. The SPICE model may include a statistical model and various netlists.

The preparation 50 also includes initializing test vectors or matrices for simulation. With the conceptual circuit of FIGS. 1A and 1B, the common path Path B has a random variable test vector to introduce local variation of specific components, e.g., of transistors, of the common path to the simulation. Example local variations that may be introduced by random variables may include threshold voltage, transistor channel width, transistor channel length, and electron mobility, which may be caused by non-uniform processing during fabrication. The test vector may include an entry for each of a user defined number events of the simulation, as discussed further below, with each entry having one or more random variables for the variation.

The critical parallel path Path A similarly has a random variable test vector or matrix. The term "test matrix" will be used subsequently in this example solely to identify the random variable table for the critical path and to distinguish from the common path test vector. The test matrix may include an entry for the user defined number of events of simulation for each represented parallel path. For example with respect to FIGS. 1A and 1B, the test matrix will have the number of events of simulation for four parallel paths. Like the test vector, each entry of the test matrix may have one or more random variables for local variation of each parallel path. The more general term "table" may refer to any means by which data is stored or formatted, such as a vector, a matrix, a combination thereof, and/or the like.

Figure 3:
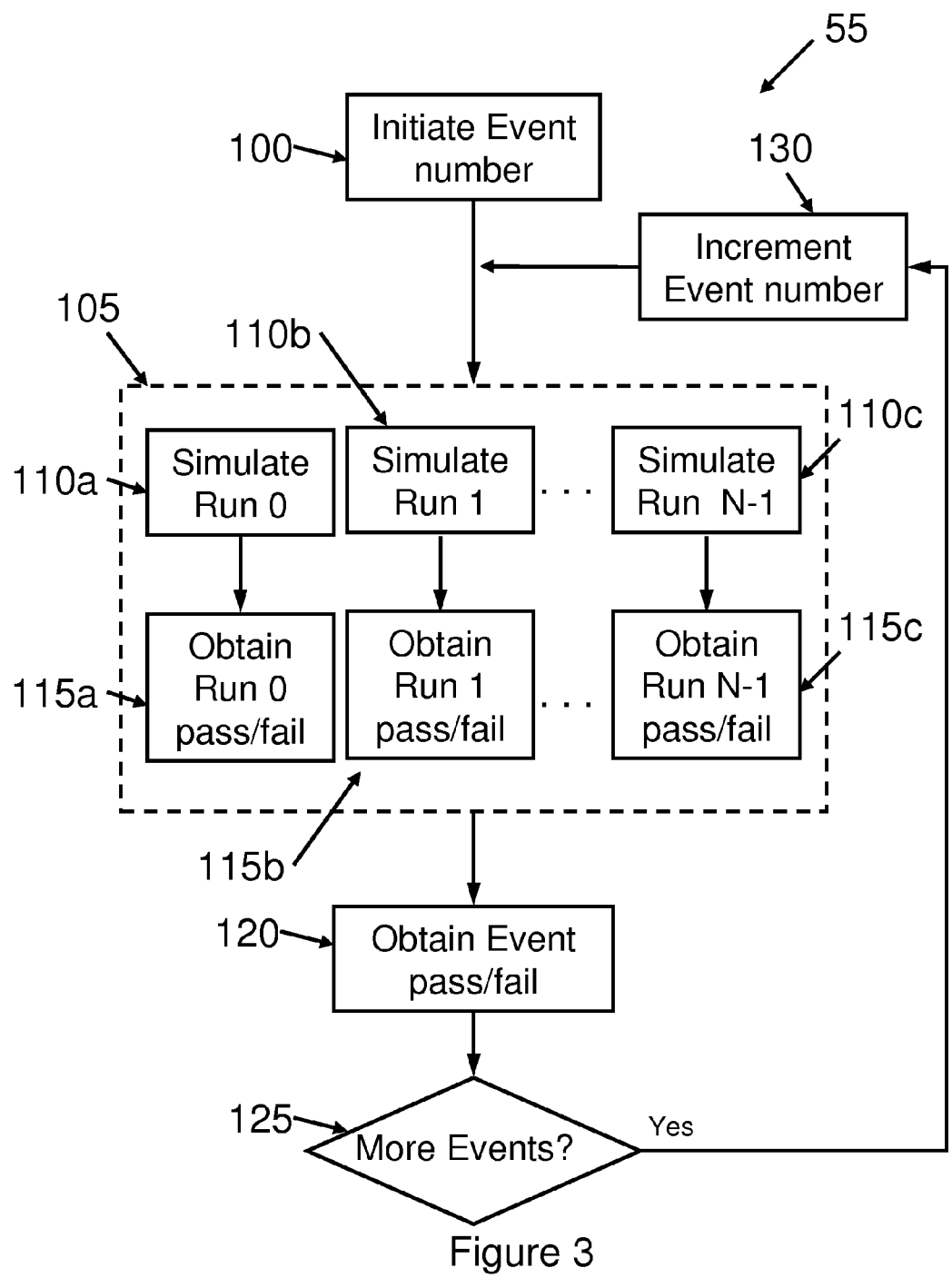
FIG. 3 is an exemplary process of a multidimensional Monte-Carlo simulation according to an embodiment.

The process further includes a multidimensional Monte-Carlo simulation 55, which is further detailed in the example shown in FIG. 3. The simulation may simulate a predetermined, e.g., user defined, number of events and a predetermined number of runs N within each event. The actual number of events and runs may be based on user preference and may be a single event and single run, more than one event and run, or a combination thereof. In the simulation 55 detailed in FIG. 3, the event number is initiated 100. Each of the N number of runs is then simulated 110*a*, 110*b*, and 110*c* using a Monte-Carlo simulation. The event number is used to determine which entries in the common path test vector and the common path test matrix are used during the simulation.

Based on the simulation of each run 110*a*, 110*b*, 110*c*, the result of each run is obtained as a pass or fail indication 115*a*, 115*b*, and 115*c*. A run may receive a pass indication when each of the simulated multiple parallel paths in combination with the common path achieves a desired specification, such as achieving a specific timing. If one of the simulated parallel paths in combination with the common path does not achieve the desired specification, then the entire run may receive a fail indication. However, the pass/fail indication of the run may be determined based on other desired parameters, and all simulated parallel paths do not necessarily have to pass for the run receive a pass indication.

As shown in the example of FIG. 3, the N number of runs are simulated in parallel 105, such as by using multi-thread or multi-central processing unit (CPU) computing. However, the N number of runs may also be simulated using an iterative process. For example, if after the simulation of each run there are more runs to be simulated, then a run number may be incremented and another run simulated until all runs for an event have been simulated. Whether simulated in parallel or iteratively, for each event, the same entries of the test vector are used for the multiple runs, but different test matrices are used for each run within an event.

Based upon the runs simulated and the run pass/fail indications, an event pass/fail indication is obtained 120. If all of the runs obtained a pass indication, then the event may receive a pass indication; otherwise, the event may receive a fail indication. Other parameters may be used to determine whether the event receives a pass or fail indication. Then, if there are more events to be simulated 125, the event number is incremented 130, and process steps are repeated. Although shown in FIG. 3 as an iterative process, the multidimensional Monte-Carlo simulation 55 does not require such an iterative process. For example, the events may be arbitrarily divided and simulated on parallel processors or systems, such as for multi-thread and multi-CPU computing. Further, for simulation of circuits with greater dimensionality, e.g., circuits with additional paths, the process may include further nesting or division of simulation in parallel for the added dimension.

Referring back to FIG. 2, the yield is predicted based on the number of pass/fail events 60 that were determined during the multidimensional Monte-Carlo simulation 55. The yield prediction may be a simple calculation of determining the percentage of pass indications of the events out of the total number of events simulated.

In some embodiments, a minimum power supply voltage Vccmin of the circuit may be swept through many values and simulated. In these embodiments, the process will determine if a sweep of the minimum power supply voltage Vccmin has ended 65. If not, the minimum power supply voltage Vccmin may be altered, e.g., by incrementing or decrementing the voltage by some fraction, integer, or other amount, and the process returns to performing the multi-dimensional Monte Carlo simulation 55. If the sweep has ended 65, a probability-chart (P-chart) drawing may be obtained 70 based on the results of the simulations for the swept range of minimum power supply voltage Vccmin. For example, the passing and/or failing events may be plotted with respect to the simulated minimum power supply voltage Vccmin. Such a chart may allow a designer to easily compare the number of failing events for each simulated minimum power supply voltage Vccmin in order to optimize the minimum power supply voltage Vccmin. Then, a minimum power supply voltage Vccmin target yield may be predicted 75 based on the results of the simulations for the swept range of minimum power supply voltage Vccmin. For example, the pass/fail events may be related to the value of the minimum power supply voltage Vccmin when the events were simulated to determine the target yield prediction.

The simulated circuit may then be optimized 80. This may include correlating the random variables in the test vector or test matrix to the pass/fail indications to determine which parameter or parameters of the circuit to modify for optimization. Other optimization techniques are readily known by persons of ordinary skill in the art. Although the process steps detailed in FIGS. 2 and 3 are shown and discussed sequentially, the order of the steps may be performed in any logical order. A particular sequence should not necessarily be implied by an indication of sequence herein.

Figure 4A:
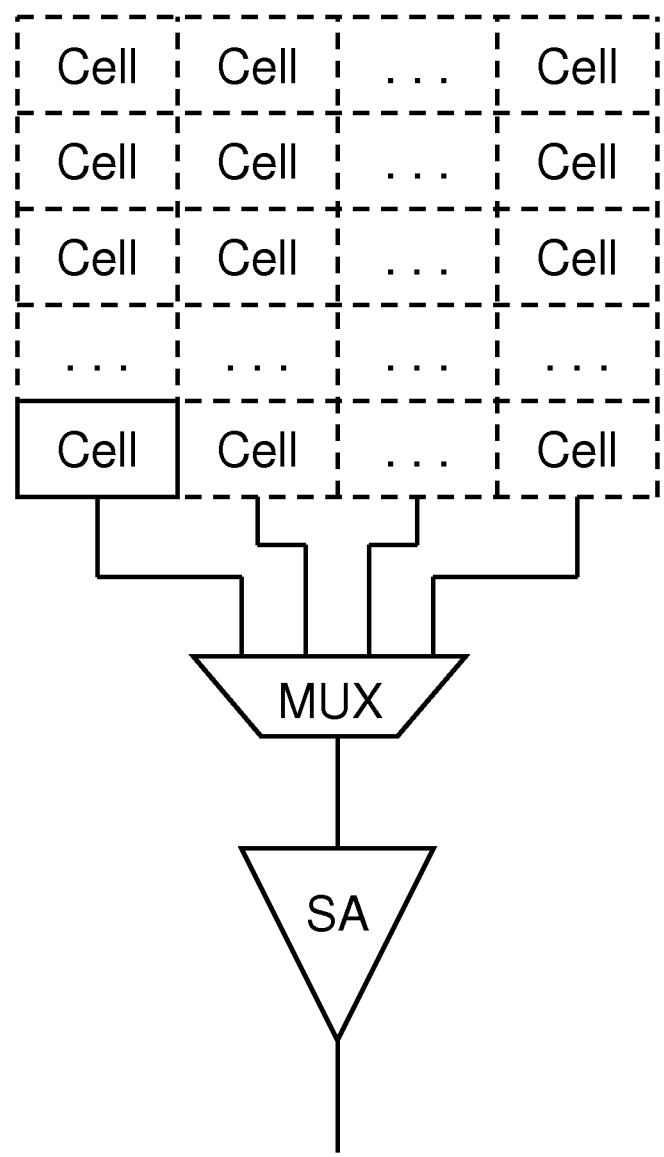

FIGS. 4A and 4B illustrate an example of an embodiment. FIG. 4A is an array of SRAM cells Cell coupled to a sense amplifier SA through a multiplexer MUX. Each SRAM cell is a parallel path to the multiplexer MUX, and from the multiplexer MUX through the sense amplifier SA is a common path. For illustration purposes, the array contains 256 SRAM cells. In preparation for simulation, the circuit, as represented by SPICE models, netlists, etc., can be reduced to a single critical SRAM cell (shown in solid lines) from the full array of SRAM cells (other cells shown in phantom). In further preparation, a random vector for the sense amplifier RandomSA[i], shown in FIG. 4B, can be set for i number of events, which is predetermined to be 1,000 from event 0 to event 999 in this example. Also, a random matrix for the SRAM array RandomSRAM[i][j] can be set for i number of events and j number of parallel paths. In this example, j is 256 for 256 SRAM cells. Further, the predetermined number of Monte-Carlo (MC) runs is four for MC run 0 to MC run 3 in this example.

At Event 0, four MC runs (0 through 3) are performed. During the simulation of Event 0, the entry for SA Random Number RandomSA[0] is used, as shown in FIG. 4B. However, for each run a different table of RandomSRAM[0][j] is used (although not explicitly shown in FIG. 4B). The j entries represent the 256 simulated parallel SRAM cells, although the circuitry for only one critical path is used for the simulation. As illustrated in FIG. 4B, the simulation continues through Event 999, e.g., through the 1,000 predetermined events.

During each event, each simulated SRAM cell will receive a pass or fail indication based upon whether the simulated SRAM cell achieved the specification parameter for each of the four runs, as shown in the "Run Pass/Fail" column of FIG. 4B. If every simulated SRAM cell receives a pass indication for an event, the event receives a pass indication, as shown in the "Event Pass/Fail" column. Otherwise, if at least one simulated SRAM cell receives a fail indication, the event receives a fail indication, for example, Event 1 in FIG. 4B. Each event and/or each run may be performed iteratively, such as shown in FIG. 3, or may be performed in parallel in, e.g., multi-thread and multi-CPU computing. With a pass or fail indication for each event, the yield prediction may be determined by dividing the total number of event pass indications by the number of events. For example, if 978 events received a pass indication, the yield may be predicted to be 978/1000 or 97.8 percent.

Figure 5:
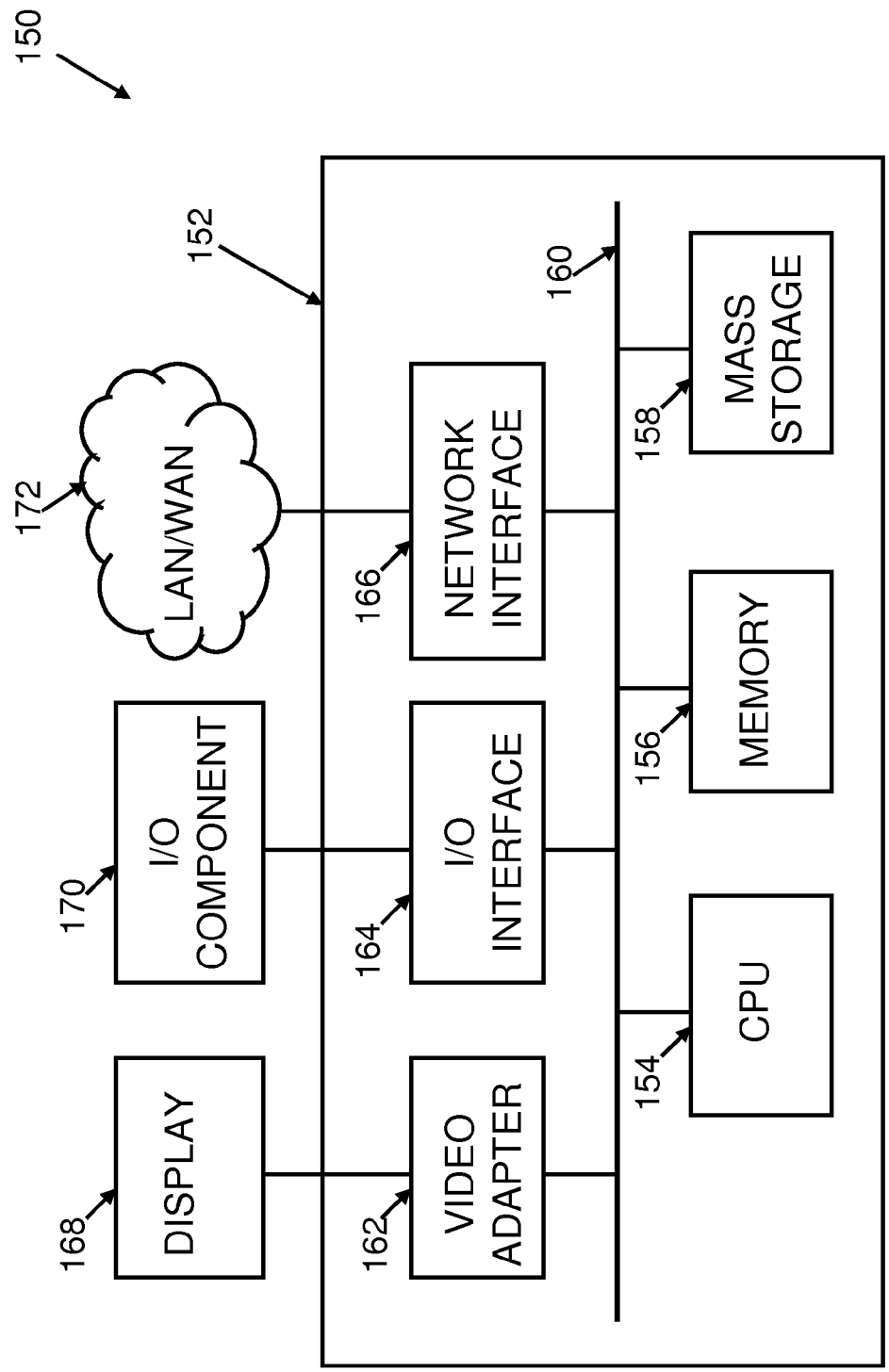
FIG. 5 depicts a block diagram of a processor based system in accordance with an embodiment.

FIG. 5 depicts a block diagram of a processor based system 150 in accordance with an embodiment. The processor based system 150 is a general purpose computer platform and may be used to implement any or all of the processes discussed herein. The processor based system 150 may comprise a processing unit 152, such as a desktop computer, a workstation, a laptop computer, or a dedicated unit customized for a particular application. The processor based system 150 may be equipped with a display 168 and one or more input/output devices 170, such as a mouse, a keyboard, or printer. The processing unit 152 may include a CPU 154, memory 156, a mass storage device 158, a video adapter 162, and an I/O interface 164 connected to a bus 160.

The bus 160 may be one or more of any type of several bus architectures including a memory bus or memory controller, a peripheral bus, or video bus. The CPU 154 may comprise any type of electronic data processor, and the memory 156 may comprise any type of system memory, such as SRAM, dynamic random access memory (DRAM), or read-only memory (ROM).

The mass storage device 158 may comprise any type of storage device configured to store data, programs, and other information and to make the data, programs, and other information accessible via the bus 160. The mass storage device 158 may comprise, for example, one or more of a hard disk drive, a magnetic disk drive, or an optical disk drive.

The video adapter 162 and the I/O interface 164 provide interfaces to couple external input and output devices to the processing unit 152. As illustrated in FIG. 5, examples of input and output devices include the display 168 coupled to the video adapter 162 and the I/O device 170, such as a mouse, keyboard, printer, and the like, coupled to the I/O interface 164. Other devices may be coupled to the processing unit 152, and additional or fewer interface cards may be utilized. For example, a serial interface card (not shown) may be used to provide a serial interface for a printer. The processing unit 152 also may include a network interface 166 that may be a wired link to a local area network (LAN) or a wide area network (WAN) 172 and/or a wireless link.

It should be noted that the processor based system 150 may include other components. For example, the processor based system 150 may include power supplies, cables, a motherboard, removable storage media, cases, and the like. These other components, although not shown, are considered part of the processor based system 150.

Embodiments may be implemented on the processor based system 150, such as by program code executed by the CPU 154. For example, the processes described above with respect to FIGS. 2 and 3 may be implemented by computer program code that is stored in memory 156, mass storage 158, or another computer-readable medium and that is executed by the CPU 154. Other information necessary to implement the processes may be saved as files, e.g., SPICE models, netlists, tables, etc., in the memory 156, mass storage 158, or a database accessible through the network interface 166, or may be input via the I/O interface. Other possible variations or implementations of embodiments will be readily understood by a person having ordinary skill in the art.

Figure 6:
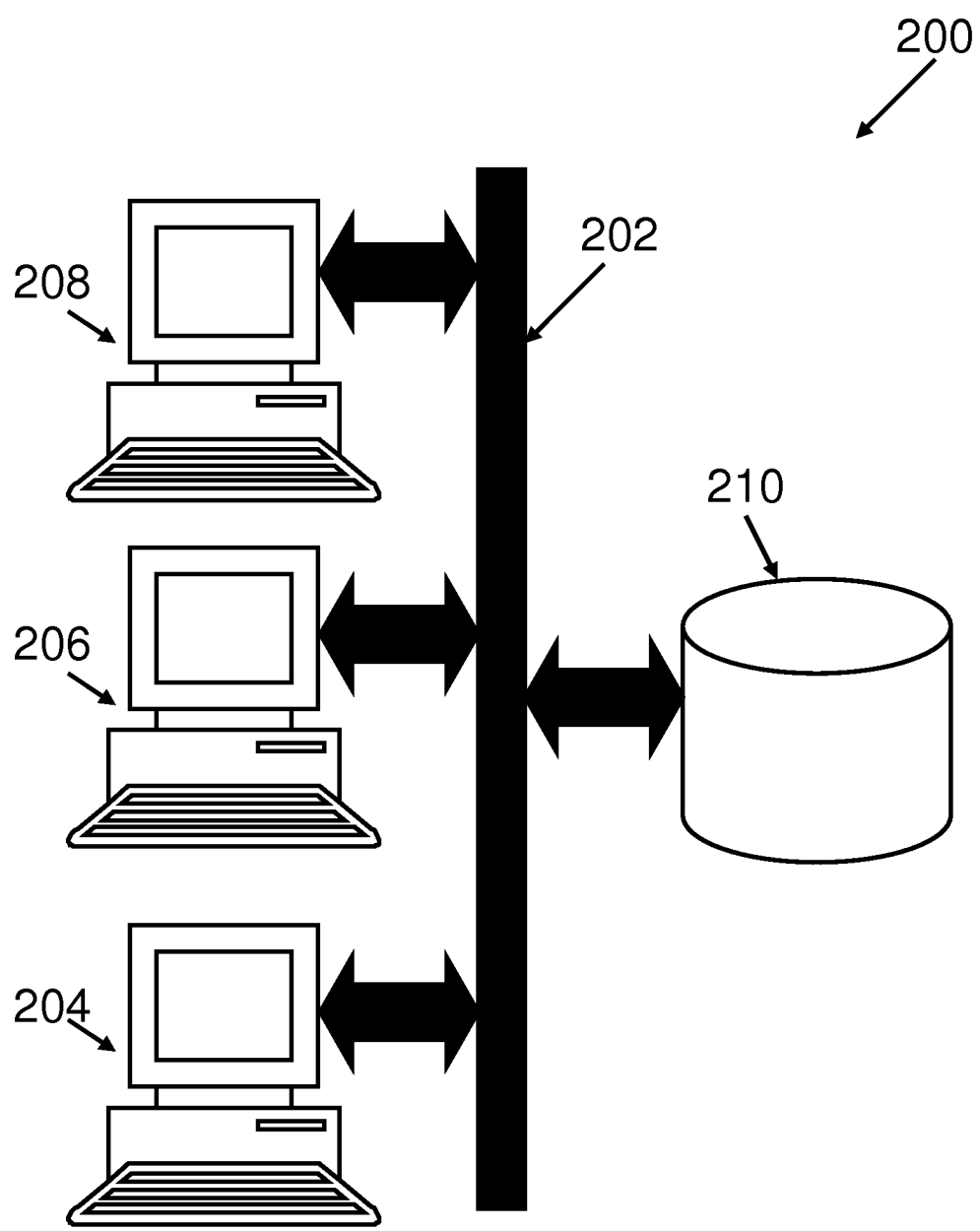
FIG. 6 is another embodiment of a system that may be used for multi-central processing unit (CPU) computing.

FIG. 6 is another embodiment of a system 200 that may be used in implement multi-CPU computing. The system 200 includes processor based systems 204, 206, and 208 that may be similar to the processor based system 150 in FIG. 5, a network 202, and a database 210. Each processor based system 204, 206, and 208 may include program code for executing various subroutines of processes, such as steps described in FIGS. 2 and 3. For example, the processor based systems 204, 206, and 208 may simulate in parallel different events and/or runs. Tables and other information common to the subroutines executed by the processor based systems 204, 206, and 208 may be stored on the database 210 and accessed from or provided to the database 210 via the network 202. Other possible variations or implementations of embodiments will be readily understood by a person having ordinary skill in the art, for example, the common information may be stored in a memory of a single computing platform that includes multiple processors configured to run different subroutines in parallel.

Embodiments, such as those discussed herein may obtain several advantages. First, by reducing parallel paths to a single critical path, the amount of circuitry used for the analysis is reduced. Also, embodiments may have significant flexibility in the number of parallel paths that the original circuitry may contain, for example, by having any number of parallel paths, because of the representation of the multiple paths by a single critical path and random table. Further, embodiments may eliminate the need for complex calculations used to determine the yield. Even further, embodiments may be suitable for multi-thread or multi-CPU computing which will reduce a simulation time because more processing power may be available for simulation.

A first embodiment includes a computer program product for providing a yield prediction. The computer program product has a non-transitory computer readable medium with a computer program embodied thereon. The computer program comprises computer program code for obtaining a representation of a circuit. The circuit comprises a common path and a critical path, and the critical path represents multiple parallel paths. The computer program further comprises computer program code for obtaining a first table representing the common path and a second table representing the multiple parallel paths and computer program code for performing a variable based simulation based on the representation of the circuit, the first table, and the second table. The computer program also comprises computer program code for determining a result indication of each of the multiple parallel paths based on the variable based simulation compared with a predetermined specification.

A second embodiment includes a method for predicting yield. The method comprises obtaining a representation of a reduced circuit. The reduced circuit comprises a common path and a critical path, and the critical path is representative of multiple parallel paths. The method further comprises, using at least one processor, performing a variable based simulation of the reduced circuit using a first table of the common path and a second table of the multiple parallel paths. The variable based simulation includes a predetermined number of events and a predetermined number of runs within each event. The method also includes determining a result indication based on the variable based simulation.

A further embodiment includes a system for yield prediction using multi-computing. The system comprises a storage node storing common data. The common data comprises a representation of a circuit including a common path and a critical path representative of multiple parallel paths, and the common data further comprises a first table representative of local variation in the common path and a second table representative of local variation in each of the multiple paths. The system further comprises a first processor configured to simulate a first predetermined number of events using a variable based simulation based on the common data, and a second processor configured to simulate a second predetermined number of events using the variable based simulation based on the common data. The system also includes a communication node between the storage node and the first processor and between the storage node and the second processor enabling access of the common data by the first processor and the second processor.

Although the present embodiments and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer program product having a non-transitory computer readable medium with a computer program embodied thereon, the computer program comprising:
   computer program code for obtaining a representation of a circuit, the circuit comprising a common path and a critical path, the critical path representing multiple parallel paths, the representation of the circuit not including the multiple parallel paths;
   computer program code for obtaining a first random variable table and a second random variable table, the first random variable table comprising first random variable data of local variation within the common path, the second random variable table comprising second random variable data of local variation within the multiple parallel paths, the first random variable table not including data representing variation within the multiple parallel paths, the second random variable table not including data representing variation within the common path;
   computer program code for performing a variable based simulation based on the representation of the circuit, the first random variable data of the local variation within the common path, and the second random variable data of the local variation within the multiple parallel paths; and
   computer program code for determining a result indication of each of the multiple parallel paths based on the variable based simulation compared with a predetermined specification.

2. The computer program product of claim 1, wherein the computer program further comprises computer program code for determining a yield prediction, wherein the yield prediction is based on a number of runs receiving a pass indication.

3. The computer program product of claim 1, wherein the computer program code for performing the variable based simulation includes computer program code for performing the variable based simulation for a predetermined number of events and for a predetermined number of runs within each of the events.

4. The computer program product of claim 3, wherein the computer program code for performing the variable based simulation uses a same first random variable table entry during the predetermined number of runs within a single event and uses at least two different second random variable table entries during each of the predetermined number of runs within the single event.

5. The computer program product of claim 3, wherein the computer program further comprises:
   computer program code for determining a result indication of each of the predetermined number of runs based on the result indication of the multiple parallel paths for each respective run; and
   computer program code for determining a result indication of each of the predetermined number of events based on the result indication of each of the predetermined number of runs within each event.

6. The computer program product of claim 1, wherein the computer program further comprises computer program code for reducing an original representation of a first circuit to the representation of the circuit, the first circuit comprising the common path and the multiple parallel paths.

7. A method comprising:
   obtaining a representation of a reduced circuit, the reduced circuit comprising a common path and a critical path, the critical path being representative of multiple parallel paths, the representation of the reduced circuit not including the multiple parallel paths;
   using at least one processor, performing a variable based simulation of the reduced circuit using a first random variable table and a second random variable table, the first random variable table comprising first random variable data of local variation within the common path, the second random variable table comprising second random variable data of local variation within the multiple parallel paths, the first random variable table not including data representing variation within the multiple parallel paths, the second random variable table not including data representing variation within the common path, the variable based simulation including a predetermined number of events and a predetermined number of runs within each event, wherein the variable based simulation uses the first random variable data of local variation within the common path in the first random variable table and the second random variable data of local variation within the multiple parallel paths in the second random variable table; and
   determining a result indication based on the variable based simulation.

8. The method of claim 7 further comprising:
   obtaining a representation of an original circuit, the original circuit comprising the common path and the multiple parallel paths; and
   reducing the representation of the original circuit to the representation of the reduced circuit.

9. The method of claim 7, wherein the variable based simulation includes using a same first random variable table entry for each run within one of the predetermined number of events.

10. The method of claim 7, wherein the variable based simulation includes using at least two different second random variable table entries during each run within one of the predetermined number of events.

11. The method of claim 7, wherein the performing the variable based simulation is performed by multiple processors.

12. The method of claim 7 further comprising predicting a yield based on the determining the result indication.

13. The method of claim 7 further comprising optimizing a representation of an original circuit comprising the common path and the multiple parallel paths, the representation of the reduced circuit being reduced from the representation of the original circuit.

14. The method of claim 7 further comprising:
sweeping a minimum power supply voltage during the performing the variable based simulation and the determining the result indication;
obtaining a minimum power supply voltage probability-chart of an original circuit comprising the common path and the multiple parallel paths based on the sweeping the minimum power supply voltage, the reduced circuit being reduced from the original circuit; and
predicting a minimum power supply voltage target yield.

15. A system comprising:
a storage node storing common data, the common data comprising a representation of a circuit including a common path and a critical path representative of multiple parallel paths, the representation of the circuit not including the multiple parallel paths, and the common data further comprising a first random variable table comprising first random variable data of local variation in the common path and a second random variable table comprising second random variable data of local variation in each of the multiple parallel paths, the first random variable table not including data representing variation within the multiple parallel paths, the second random variable table not including data representing variation within the common path;
a first processor configured to simulate a first predetermined number of events using a variable based simulation based on the representation of the circuit, the first random variable data of local variation in the common path in the first random variable table, and the second random variable data of local variation in each of the multiple parallel paths in the second random variable table;
a second processor configured to simulate a second predetermined number of events using the variable based simulation based on the representation of the circuit, the first random variable data of local variation in the common path in the first random variable table, and the second random variable data of local variation in each of the multiple parallel paths in the second random variable table; and
a communication node between the storage node and the first processor and between the storage node and the second processor enabling access of the common data by the first processor and the second processor.

16. The system of claim 15, wherein the first processor and the second processor each are configured to simulate a predetermined number of runs within each of first predetermined number of events and each of the second predetermined number of events, respectively.

17. The system of claim 16, wherein the first processor and the second processor each are configured to use the variable based simulation based on a same first random variable table entry for each run of a respective event.

18. The system of claim 16, wherein the first processor and the second processor each are configured to use the variable based simulation based on at least two different second random variable table entries during each run of a respective event.

19. The system of claim 15, wherein the first processor and the second processor are each configured to provide a result indication for each of the first predetermined number of events and each of the second predetermined number of events, respectively.

20. The system of claim 19 further comprising a third processor configured to calculate a predicted yield based on the result indication of each of the first predetermined number of events and the second predetermined number of events.

* * * * *